US007012853B2

(12) United States Patent
Iseli et al.

(10) Patent No.: US 7,012,853 B2
(45) Date of Patent: Mar. 14, 2006

(54) SEISMIC DATA ACQUISITION APPARATUS AND METHOD

(75) Inventors: James Iseli, Allen, TX (US); Daniel Schumacher, Richardson, TX (US); David Bristow, Sugar Land, TX (US); Allan Johnson, Bellville, TX (US); Greyson Knapp, Houston, TX (US); Gary Crews, Plano, TX (US); Charles Kelly, Lewisville, TX (US); Robert Cronan, Frisco, TX (US); Andras Feszthammer, Stafford, TX (US)

(73) Assignee: Input/Output, Inc., Stafford, TX (US)

(*) Notice: Subject to any disclaimer, the term of this patent is extended or adjusted under 35 U.S.C. 154(b) by 0 days.

(21) Appl. No.: 10/967,728

(22) Filed: Oct. 18, 2004

(65) Prior Publication Data

US 2005/0083784 A1 Apr. 21, 2005

Related U.S. Application Data

(63) Continuation of application No. 10/237,469, filed on Sep. 9, 2002, now abandoned.

(60) Provisional application No. 60/318,086, filed on Sep. 7, 2001.

(51) Int. Cl.
*G01V 1/16* (2006.01)

(52) U.S. Cl. ............................. 367/78; 367/76; 367/63

(58) Field of Classification Search .................. 367/60, 367/63, 76, 77, 78, 79
See application file for complete search history.

(56) References Cited

U.S. PATENT DOCUMENTS

| | | | | |
|---|---|---|---|---|
| 4,712,199 A | * | 12/1987 | Rialan et al. | 367/76 |
| 5,659,195 A | | 8/1997 | Kaiser et al. | 257/415 |
| 5,745,392 A | | 4/1998 | Ergas et al. | 364/715.02 |
| 6,011,753 A | | 1/2000 | Chien | 367/21 |
| 6,115,325 A | | 9/2000 | Chien et al. | 367/21 |
| 6,292,108 B1 | | 9/2001 | Straser et al. | 340/870.11 |
| 6,377,184 B1 | | 4/2002 | Minker | 340/635 |
| 6,411,866 B1 | | 6/2002 | Cavanagh | 701/1 |
| 6,459,654 B1 | | 10/2002 | Bary et al. | 367/77 |
| 6,671,222 B1 | | 12/2003 | Wilson et al. | 367/13 |
| 6,701,788 B1 | * | 3/2004 | Babala | 73/649 |
| 6,714,761 B1 | | 3/2004 | Anderson, III | 455/7 |

* cited by examiner

Primary Examiner—Ian J. Lobo
(74) Attorney, Agent, or Firm—Madan, Mossman & Sriram, P.C.

(57) ABSTRACT

The present invention provides a method and apparatus of acquiring and processing seismic data. One or more controllers are each coupled to seismic sensors and to each other to form a network of data acquisition units. A main controller is coupled to a crossline unit via a cable comprising a synchronizing conductor and one or more power/data conductors. Commands and data are packaged such that multiple routings are possible without affecting final calculations. Each crossline unit is capable of accepting a fiber optic input, a wire input or a combination.

39 Claims, 6 Drawing Sheets

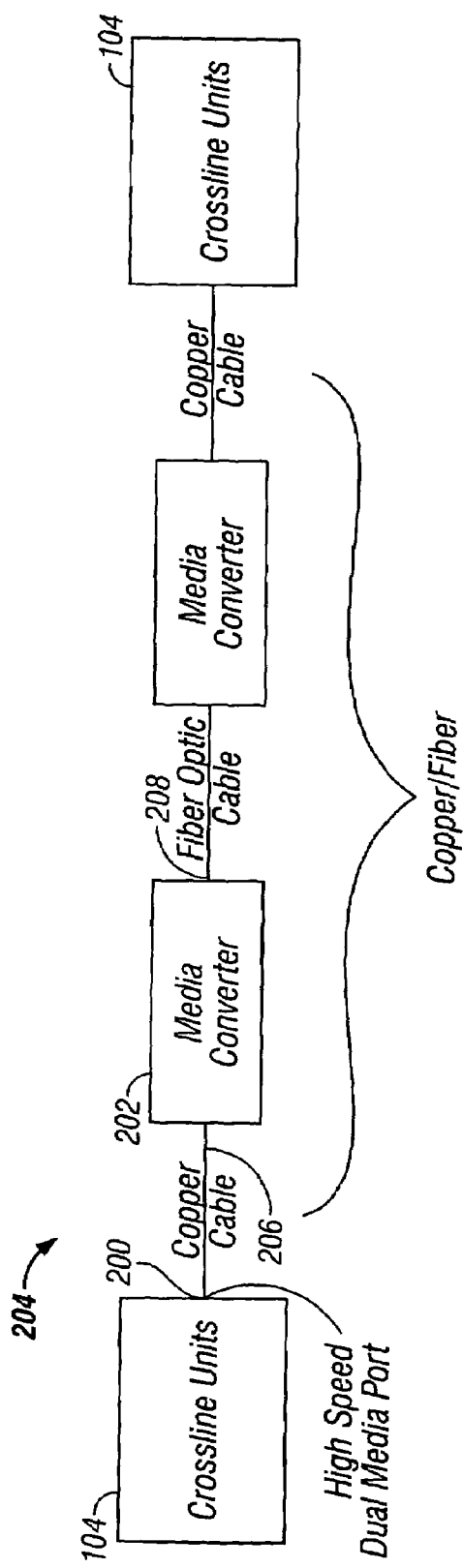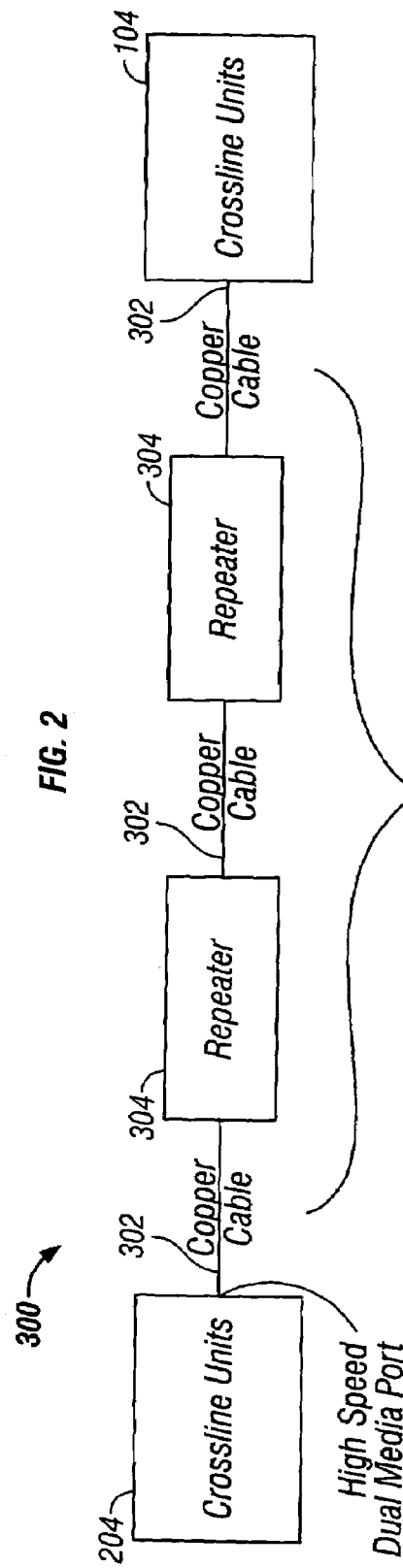

SEISMIC DATA ACQUISITION APPARATUS AND METHOD

CROSS-REFERENCE TO RELATED APPLICATION

This application is a CON of Ser. No. 10/237,469, filed Sep. 9, 2002, now abandoned, which is related to provisional U.S. Patent Application Ser. No. 60/318,086 filed on Sep. 7, 2001 the entire contents of which are hereby incorporated herein by reference.

BACKGROUND OF THE INVENTION

1. Field of the Invention

This invention relates generally to geologic surveys and more particularly to an apparatus and method for acquiring and processing seismic data.

2. Description of the Related Art

Conventional geophone and hydrophone systems used in seismic prospecting typically have several sensors that produce analog signals indicative of a seismic wave. The seismic wave is usually produced by an energy source such as a vibrator truck, explosives or by an air gun in the case of a hydrophone system. These seismic signals are then conducted to acquisition/conversion circuitry. The analog signals from one or more remote seismic sensors (hydrophones, geophones, or other seismic sensors) are sampled and converted to a series of digital values by the acquisition/conversion circuitry. The acquisition/conversion circuitry is typically configurable to, for example, adjust the sampling rate, alter any digital filtering or other digital signal processing parameters, or perform diagnostics.

One or more of these acquisition/conversion circuits are connected to a data collection unit. Each data collection unit collects the series of digital values for all the seismic sensors connected to all the acquisition/conversion units connected to it. The data collection unit passes that data to a system controller, usually the truck, which includes a seismic recording device or Central Recording System ("CRS").

A conventional system as described above is typically used in the seismic industry to enable a seismic data acquisition method called remote digitization. In this method a small number of analog signals are conveyed by wire to an analog to digital converter called a "field box" located remotely from the Central Recording System. In this field box analog signals acquired by the sensors are converted to digital form. Immediately after the conversion, digital data are transmitted to the CRS via serial communication. Typically, a processor and software are used to assign a time slot for transmitting the data. By example, the box closest to the CRS is assigned the first time slot and the next box the second time slot and so forth. A set of digital values from a field box associated with a particular time slot is called a trace. After all of the signals are digitized synchronously, each field box transmits the first trace at the first time. Then the second box would transmit the data for the first trace in the second time slot and so forth down the line. After all of the trace data for the first time slot are transmitted, i.e. time-one samples, then the process is repeated for another trace from all of the boxes i.e. time-two samples. In this manner, all of the data from the remote field units is transmitted to the CRS.

Early in the development of remote digitization systems the data were immediately written to tape with all of time-one samples from all of the traces followed by time-two samples of all the traces. This method is called multiplexed. In larger systems, the CRS typically uses the known structure of the data to collect all of the time samples for one location or trace in sequential memory or tape location. This organization is called demultiplexed and is needed by the processing systems that will receive the seismic data.

The conventional system has several limitations, especially as the number of traces in the recording system increase or redundant methods are needed to improve the reliability of the system. The order that data arrives at the CRS is used to imply or calculate the location of the field box sending the data to the CRS. Using arrival timing in this fashion means that the data cannot be sent via a route other than the predetermined initial route. If traces are contaminated during, transmission they must continue to be passed through the system to preserve the location so that the CRS can keep track of location. This contaminated data causes unexpected errors and failures of the system. The system must add some bits to the data that is transmitted to control the transmission. Because each data value is sent by itself, immediately upon acquisition, the overhead becomes very large and limits the amount of seismic data that can be transmitted over a single channel.

Another drawback of the conventional system is the time required to recover from corrupted or otherwise unusable data packages transmitted from the data collection units to the main controller recorder.

Another drawback of the conventional system is that a system designer typically must decide to use fiber optic cable or wire conductor cable to interconnect components regardless of system length requirements. The typical system component having fiber optic connectors is prone to failure caused by environmental conditions and is costly to use for shorter system lengths. Although copper wire is cost effective at shorter distances, a wire cable has a limited frequency response over longer distances and is much more cumbersome to deploy and retrieve.

SUMMARY OF THE INVENTION

The present invention addresses the above-identified problems found in the conventional seismic data acquisition system by providing a system having distributed control over the several units comprising the system. Additionally, the present invention provides an apparatus and method for packaging and transmitting data efficiently and with more reliability.

One aspect of the present invention provides a seismic data acquisition apparatus having a plurality of sensors for detecting a seismic event with each sensor having an output indicative of the seismic event and at least one control unit coupled to the plurality of sensors receiving each sensor's output. The unit is adapted to transmit the received outputs as a data packet and each data packet includes one or more characterizing bits.

Another aspect of the present invention provides a seismic data acquisition system containing a plurality of seismic sensors for detecting a seismic event with each sensor having an output indicative of the seismic event. The system includes at least one field unit coupled to the plurality of sensors receiving each sensor's output. The unit is adapted to transmit the received outputs as a data packet with each data packet including one or more characterizing bits. The seismic data acquisition system contains a second control unit coupled to the first control unit for combining data packets received from a plurality of other control units. A main control and recording unit is coupled to the second control unit for receiving the combined data packets.

A third aspect of the present invention is a seismic data acquisition cable containing a first cable section including wire connectors coupling a connector at one end of the first cable section to a circuit at another end of the first cable section, wherein the circuit is adapted to convert electrical signals to optical signals. A second cable is coupled to the circuit with the second cable section including optic fibers.

A fourth aspect of the present invention is a seismic data acquisition cable containing a first cable section including conductors coupling a connector at one end of the first cable section to a circuit at another end of the first cable section wherein the circuit is adapted to condition electrical signals and to retransmit the conditioned electrical signals to a second cable section coupled to a circuit.

A fifth aspect of the present invention is a method of seismic data acquisition sensing acoustic energy with a plurality of sensors with each sensor providing an output indicative of the sensed energy and combining the sensor outputs into a data packet, wherein the data packet includes one or more characterizing bits.

A sixth aspect of the present invention is a method of deploying a seismic data acquisition system. The method includes extending a first signal transmission medium over a first distance, coupling the first signal transmission medium to a field unit extending a second signal transmission medium over second distance, coupling the second signal transmission medium to a plurality of sensors, and coupling the first signal transmission medium to a central control unit. The method includes reconfiguring the system to have the second signal transmission medium coupled to the central control unit and coupling the first signal transmission medium to the plurality of sensors. A conductive wire is used as the signal transmission medium for short distances and an optic fiber is used for transmitting signals over a long distance. The reconfiguration is made with the use of a field unit having multiple ports, a sensing circuit to determine the media type connected to the unit and a media converter circuit.

BRIEF DESCRIPTION OF THE DRAWINGS

The novel features of this invention, as well as the invention itself, will be best understood from the attached drawings, taken along with the following description, in which similar reference characters refer to similar parts, and in which:

FIG. 2 is a schematic showing a coupling arrangement for the several units of FIG. 1 suited for longer system lengths;

FIG. 3 is a schematic showing a coupling arrangement for the several units of FIG. 1 adapted for shorter system lengths;

DETAILED DESCRIPTION OF THE INVENTION

Figure 1:
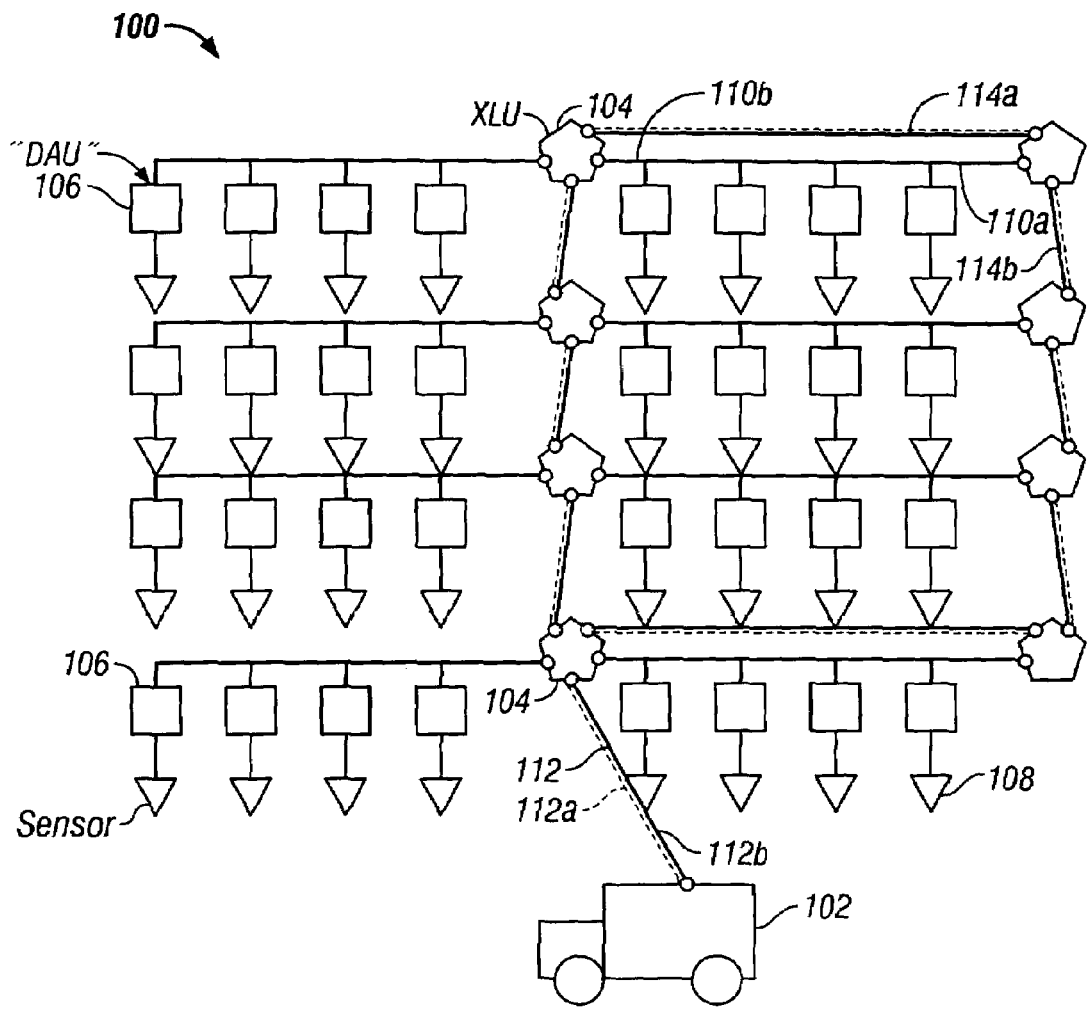
FIG. 1 is a system schematic of one embodiment of a seismic data acquisition system according to the present invention.

FIG. 1 is a system schematic of one embodiment of a seismic data acquisition system according to the present invention. The system 100 includes a primary control and recording unit 102 for delivering commands to and receiving data signals from other units in the system 100. As shown, the primary control and recording unit or central recording system ("CRS") 102 is a mobile unit ("truck"). Alternatively, the primary control and recording unit may be housed in any vehicle or carrier, or may be permanently or semi-permanently installed at a predetermined location.

The primary control and recording unit 102 is coupled to an intermediate data control unit known as a crossline unit ("XLU") 104. The XLU 104 is coupled to a plurality of data acquisition units ("DAUs") 106, also referred to herein as "field boxes". As shown, the couplings 114a and 114b between XLUs 104 provide redundant transmission paths as will be further described later. Also shown are redundant transmission paths 110a and 110b between each DAU group and XLUs to ensure continuous data transmission even when a primary transmission fails or is otherwise not viable. One or more sensors 108 are coupled to each DAU 106. The sensors 108 are preferably micromachined micro-electromechanical system accelerometers referred to as MEMS accelerometers. In a preferred embodiment, each accelerometer package 108 includes a three-component MEMS accelerometer sensor having three orthogonal axes of sensitivity. The sensors, however, may alternatively be any conventional sensor for sensing acoustic energy waves.

A sensor 108 detects a seismic event such as an acoustic wave and converts the acoustic energy into a signal. The signal is received by an associated DAU 106, which digitizes the signal and transmits the digital result to the XLU. Signal packets are created using electronic circuitry preferably housed in the DAU.

The XLU receives digitized results (packets) from the plurality of DAU's 106 and combines the several results for transmission to the CRS 102. Each packet comprises digitized signals including one or more bits representing the sensed seismic signal and one or more bits "characterizing bits" for identifying the transmitted signal. Each characterizing bit includes information relating to one or more of sensor location, time of transmission, sensor identification, trace number and record identification.

In one embodiment, the sensors 108 are micromachined accelerometers integrally packaged with a converter thereby providing a digital output to its associated DAU 106, or directly to an XLU 104.

In one embodiment, couplings 112 between the truck and XLU, and between the XLU and DAUs are cables including one or more power/data conductors 112a and a synchronizing conductor 112b used for system timing. The couplings 112 may be any suitable coupling capable of transferring electrical power and data signals. It is not necessary that one coupling 112a be the same coupling type as the other coupling 112b. Exemplary couplings may be any combination of wire, radio frequency, optical fiber, or electromagnetic. Furthermore, couplings 112a and 112b might comprise a first signal (synchronizing signal) riding on a second power and/or data signal transmitted along a single transmission path or conductor.

Figure 4:
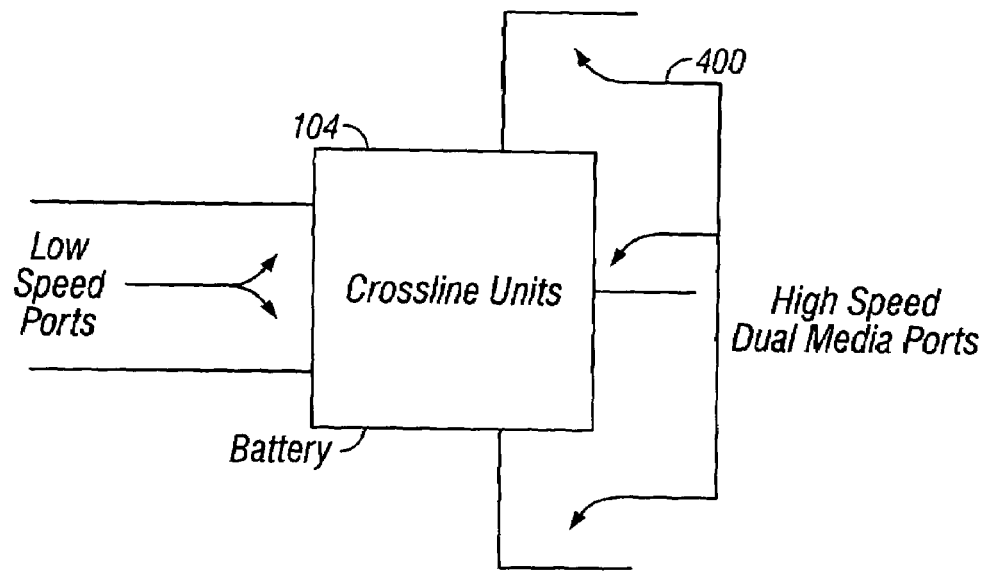
FIG. 4 is a diagram of a crossline unit according to the present invention that allows for the connection of either coupling arrangement shown in FIGS. 2 and 3.

FIGS. 2–4 show a particularly useful embodiment of the present invention wherein the XLUs 104 are adapted to sense the coupling type used and are further adapted to accept wire conductors, fiber optic conductors or a combination of both to allow for adapting the system 100 to different length requirements.

The connection between XLUs 104 can be either 100 Mb Ethernet protocol or Gigabit Ethernet protocol. Copper cable may be used to transmit 100 Mbit Ethernet protocol and optical fiber may be used to transmit either protocol. Additionally, connection a synchronization signal is transmitted separate from the Ethernet signals for copper wire but may be wavelength division multiplexed to share a fiber with Ethernet.

Compared to copper cable optical fiber has many desirable features compared to copper however it also has some drawbacks. Specifically the features are low loss allowing long transmission distances, and lightweight easing manual transportation, deployment and pickup of the cables by the user. The drawbacks of optical fiber in this environment are associated with the use of optical connectors. Optical connectors which are required at the cable ends in a conventional system are sensitive to contamination by dust, sand, and other foreign materials often encountered in the seismic field environment. The embodiment shown in FIGS. 2–4 retains the benefits of using optical fiber while eliminating the use of problematic optical connector used in the conventional system.

Referring to FIG. 2. The XLU 104 is connected by a wire connector 200 to a cable 204. The cable 204 includes a short cable section 206, typically less than 1 meter, for connecting the XLU 104 to a media converter 202 integrally disposed within the cable 204. The short cable section 206 preferably comprises copper wire for coupling the XLU 104 to the media converter 202, although any suitable wire conductor is considered within the scope of this invention. Within the media converter 202 electrical signals are converted to optical signals and vice versa using well-known circuitry. There are no external connectors on the media converter 202 as it is an integral part of the cable 204. Optical fiber is then used for a major span 208 of the cable 204. The major fiber optic span 208 supports nominal distances of up to 4 km with commonly commercially available fiber. Greater distances may be achieved using specially designed optic fibers. The media converter eliminates optical connectors in the cable 204. The fiber cable 208 supports either 100 Mbit Ethernet or Gigabit Ethernet. Additionally, synchronization signal transmission and reception is supported in the fiber cable through the media converter. These signals may be transmitted on a single fiber using wavelengths divisions multiplexing techniques.

FIG. 3 is a schematic showing a coupling arrangement for the several units of FIG. 1 adapted for shorter system lengths. For shorter cable distances, e.g. up to 400 meters, it is desirable to have a cable comprising only wire conductors, because the advantages of fiber diminish for shorter cables where weight and loss are not as important in view of the high cost of fiber cables. Shown are two XLUs 104 coupled using a cable 300 according to the present invention. The cable 300 comprises wire conductors 302 and repeater modules 304. Each repeater module 304 is a bi-directional device adapted to receive a data package and retransmit the data package after conditioning the package signal. In a preferred embodiment, the repeater modules 304 are integrally disposed within the cable 300 to eliminate the need for external connectors. Standard 100 Mbit Ethernet will support only cable lengths up to 100 meters with commercially available cable. Thus, the repeater cable shown in FIG. 3 achieves the 400-meter distance by the integration of the repeater modules 304 molded within the cable. These active repeater modules 304 regenerate the signal in both directions and can achieve a transmission distance of 133 meters between repeaters and up to 400 meters overall. The copper repeater cable shown supports a 100 Mbit Ethernet and a synchronization signal.

FIG. 4 is a diagram of a crossline unit according to the present invention that allows for the connection of either coupling arrangement shown in FIGS. 2 and 3. Connection to the XLU 104 is made using one or more ports 400. These ports 400 are collectively referred to as a High Speed Dual Media Port. This port 400 accepts either of the cable configurations 204 or 300 described above and shown in FIGS. 2 and 3. Circuits (not separately shown) within the XLU 104 detects whether a cable is copper repeater cable 300 or copper/fiber cable 202 and responds accordingly. The detection circuit may be of the type described in U.S. Provisional Application Ser. No. 60/297,354 filed on Jun. 11, 2001, the specification of which is incorporated herein by reference and which is assigned to the assignee of this invention. The XLU 104 allows up to 3 simultaneous high speed connections to the unit of any combination of copper repeater cable and copper/fiber cable. In this fashion a network of XLU's, DAU's and sensors may be combined in any needed configuration without the need to specially design any single component.

Those skilled in the art would recognize with the benefit of this disclosure that the apparatus of the present invention might be practiced in numerous embodiments enabled by this teaching. Thus, the identification and illustration of XLU's and DAU's as separate field units should not be construed as a necessary limitation of this invention. At a conceptual level, the present invention provides an apparatus for recording seismic data utilizing a unique data package structure that alleviates the need for precise timing control for signal transmission. Therefore, any reference to XLU and/or DAU could be construed as functional designations within one or more housings or as physical designations in separate housings. Moreover, the functions of a DAU could, in part or in whole, be transferred to an XLU.

The method of the present invention may be practiced using any of the embodiments described above and shown in FIGS. 1–4. The method includes power management of the seismic data acquisition system 100, data packaging and rerouting.

The primary building block of a method according to the present invention is a novel paradigm to seismic recording systems for collecting several time samples of a single location into a bundle or packet. These packets are large enough that the necessary information to identify and route the packet is not a significant factor to the number of bits that must be transmitted. By example, 93% of the bits transmitted using the system of the present invention are seismic data. These packets are transmitted to the CRS for recording as they assembled, rather than awaiting a time slot as with conventional methods. Thus, no assignment of time slot or master order control across the system is needed. This offers several advantages. Each packet is transmitted from one field unit 104 to the next field unit 104 of the array. At each location, a new available packet is added to the string of packets that are being transmitted, whenever there is time to introduce a new packet. It is not necessary for there to be a repeated series of clock pulses to keep all units in synchronization, so packets are not transmitted simultaneously. Thus, if the clock from the CRS is lost during the acquisition process a unit can continue to acquire and transmit data on an internal clock without interfering with other units or disrupting overall timing.

This packet approach is not used in conventional systems, because using a conventional system typically results in unacceptable loss of several time samples from a single location. A system according to the present invention increases reliability over the conventional system by the combined use of several techniques.

Before data collection process begins, each field unit 104 is assigned a trace number for a particular record and a record ID for the seismic event recorded. As each packet is assembled for transmission, it is given a sequence number that represents the time of the first sample in the packet. Because the packet may be lost or corrupted in transmission, the data for each packet is stored in memory of the DAU. This remote data storage provides a backup copy of the data in case there are problems with transmission.

At substantially the same time that the message is sent to the field units to assign trace number and record ID, a Field Equipment Interface (FEI) (software not separately shown) disposed in the CRS establishes a table in the CRS. This table contains a matrix of all the packets that are expected for an acquisition. Additionally, the table contains information about the memory location that packets are to occupy when they arrive at the CRS. As each packet arrives, the trace number and sequence number contained in the packet are examined by the FEI. The packet is "checked off" in the table and the seismic data is written to the proper location in the CRS memory. In this manner, the order of packet arrival is not important to determining the corresponding location of the sensor that created the data. That information is part of the packet information. In the same manner, it is possible for the last time sequence of data to arrive before the first sequence packet. The sequence number is evaluated by the FEI and is used to control the memory location of the data storage without affecting other parts or timing of the system.

A Cyclic Redundancy Counter (software bits) is added to the end of each packet. As the packet is passed from unit to unit of the field equipment the CRC is checked with the data to determine if there was an error in transmitting the packet. For the exchange between two units, if there is an error in the transmission a command is sent to the previous unit to send the packet again. The data is transmitted from unit to unit in this manner until it reaches a higher order element that connects line segments. If a packet is corrupted at this level, there is no adjacent unit to command retransmission. In this case, the data package block is simply dropped and not retransmitted. Thus, all packets that are being handled and passed on by the system are uncorrupted packets. This method substantially reduces unexpected errors and system failures caused by corrupted data.

As the FEI checks off the arrival of data packets, the matrix is examined for missing packets. The FEI sends a command to a specific remote unit to retransmit a specified packet based on its time sequence if a missing packet is detected. Whenever missing packets cannot be retransmitted successfully, the corresponding locations in memory are filled with error values. A summary of the missing packets is sent to a master control unit, which is used to determine if the record is acceptable.

Rerouting and retransmission capability enabled by the system according to the present invention creates the possibility that packets from one seismic event or record will arrive at the CRS at the same time as the last packets from the previous event. Each record or event is assigned a Record ID. This same Record ID is associated with a unique packet table in the FEI. The FEI keeps the previous table open during the primary acquisition of the current table to allow for the late arrival of packets and retransmission requests. The users of the system set the amount of time, but it is expected that at least three tables would be active, i.e. open, at any time.

In another embodiment of the present invention, test results from positions that will be used in the future are evaluated in addition to receiving seismic data from remote units. In seismic terms, this is called "look ahead testing". This is very difficult with conventional data transmission methods to include this data with the seismic data, because it disrupts the order of the data that is used to determine the location. In the present method, test results are assigned a different identifier in the packet type. The status packet can then be transmitted from unit to unit back to the CRS in the same way that data packets are transmitted. At the FEI the type is examined and the data and status packets are separated for different data processing.

One of the challenges of this method for status messaging is to tell the source of the message. To address this issue a unique Status ID is assigned to each unit as it is powered up. Any status message then contains this Status ID to identify the source of a status response. A further extension to the status message is possible now that data and status can be mixed in the same data stream. This is the idea of an "unsolicited" status or an "emergency" message. There are several conditions in the system that require immediate attention. By example the power available from a battery could have dropped to a level so low that failure will happen in the next few minutes. In a large system the operator may not ask for a battery status often enough to measure this condition. The remote unit is programmed to send an "unsolicited" status to indicate this error to the CRS. Again the packet of status is coded so that the FEI recognizes this packet as unsolicited status and not as a routine response to a query, and thus treat it as needing immediate attention.

In another method according to the present invention, a third type of packet is the "Command" packet. This packet normally travels from the Central Recording System to the ground units to control the behavior or parameters of the unit. There are also unit-to-unit command packets that are sent autonomously by the field units. These packets contain routing information so that they can be sent to some units or all units. The command packets are mixed with the data and status packets and sent by the same network protocols as the other types of packets. The method allows the field units and the CRS to quickly determine the type of packet that is presented and to either reject or act on the packet based on its type and routing information.

Networking Methods

Once the concept of packet organization for sending seismic data has been established then broader concepts from network theory can be applied to practical problems and limitations in the transmission of seismic data and status messages. For brevity, the term "seismic packet" will be used to mean either or all status, command or data packets.

A feature of a seismic system is that all remote digitizer units sample in unison to an accuracy of 0.25 microseconds or better across the complete system and that they hold that accuracy for length of the record. This accuracy is much less than the time to transmit a signal through wires across the distance of a seismic recording system. This is further complicated by the potential for time delays in switches and rerouting of packets. One of the major limitations of conventional systems using packet transmission and established communication standards like Ethernet is that timing information and control is lost.

In one method according to the present invention, a timing synchronization signal and the seismic packets are transmitted by separate dedicated wires or in a single fiber as discussed above. This allows the use of application-specific protocol and methodology to distribute the timing signals and at the same time well established methods and protocols to distribute information that can be put into packets.

Using an XLU described above and shown in FIG. 4 according to the present invention, it is possible to plug any of the connectors into the unit in any order. One connector would be for cable toward the CRS and one away. The third connector would be used to make a redundant connection to a third node or cross line unit. It is very easy with this third connection to make networks that are very complex with many routes between two nodes. Therefore it is possible that any packet whether it is data or command could arrive at the same location from two different directions and at slightly different times. Network theory is used to control data management. A class of devices known as managed switches are used to determine the direction from which data are coming and where the data are to go. A managed switch may be, and is preferably a software solution managed within a particular unit such as an XLU. This is covered under the general class of Ethernet messaging protocol that is used by the system. A managed switch keeps a list of which port is generating information. If that unit appears in the "to" part of the message the switch sends the data to that port. Secondly, the switch sends out network messages to establish the health of the network. If there are two ways for a packet to get to the same node or cross line unit, one of the links is deliberately disabled. The managed switches continue to poll the network on a periodic basis. If links or units fail, the network is readjusted and the messages are sent by a different route. In this manner, a link can fail and the seismic crew can continue to record while repairs are made.

For a seismic system, it is not enough to reroute the seismic packets as the managed switch does. It is likely that a link has failed because the cable between the ground units has failed. For a seismic system, this also means that the all important synchronization signal is lost. The units can continue for a short time on internal clocks, but the master clocks are needed for long-term synchronization of the system. It is necessary then that the switches not only redirect the seismic data, but also establish new timing control paths. There is also the need to update the time adjustment for the different route, because the length and number of nodes will be different and cause different delays. In this invention, the information from the health message of the standard protocol is used to make the decisions on switching the timing control path. By this method, the timing control is provided with a redundant path for reliability with automatic switching of the route enabled by the method of using the data network performance to switch the synchronization signal.

Another networking embodiment of the present invention is the automatic adding of units to the network. The XLUs and DAUs are constantly sending network messages looking for new units. When a new unit responds it is attached to the network and the user display in the CRS shows the unit to be available for use to collect seismic data.

Figure 6:
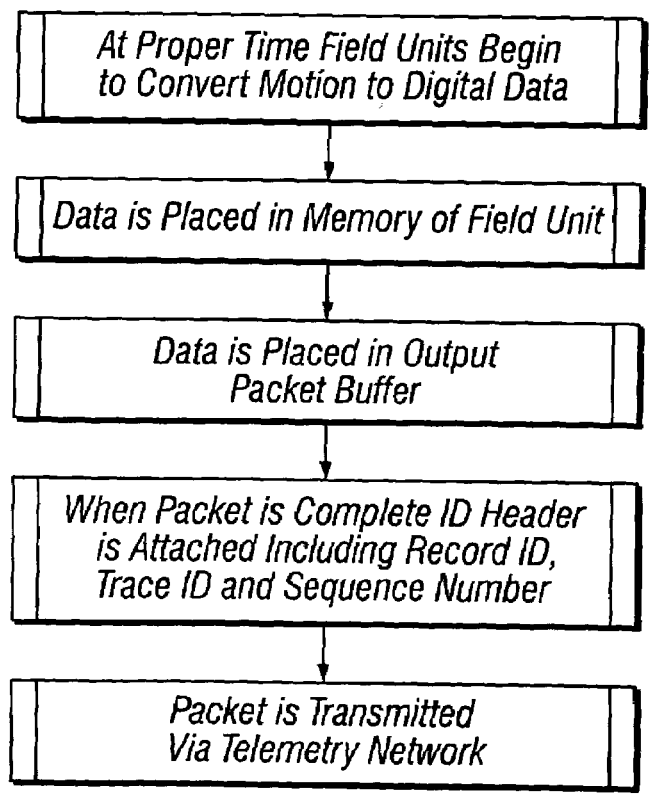
FIG. 6 is a flow chart showing a method of data acquisition and conditioning according to the present invention.
Figure 5:
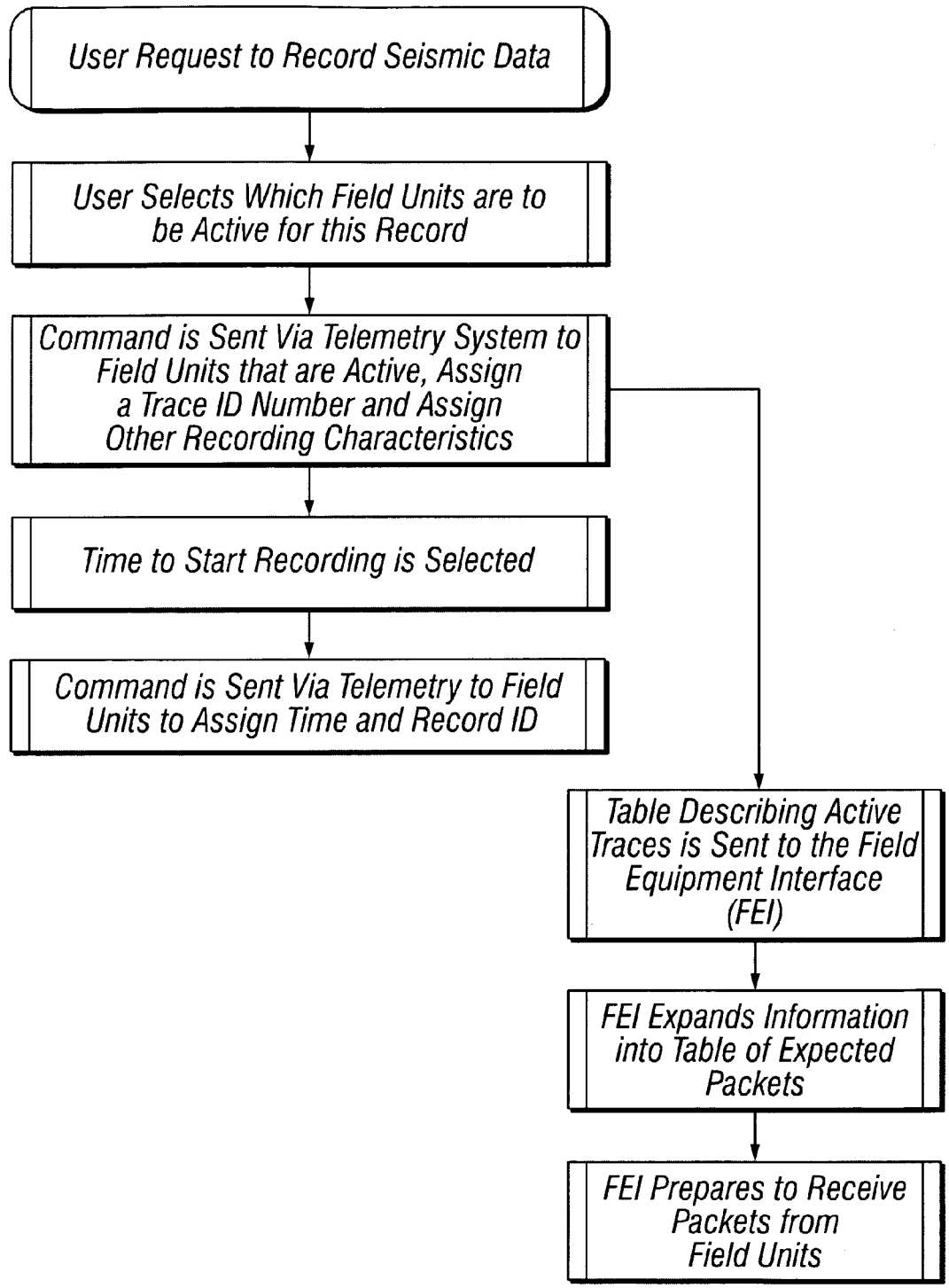
FIG. 5 is a flow chart showing a method of system initialization according to the present invention.

An exemplary data-handling method according to the present invention is shown in FIGS. 5–7. FIG. 5 is a flow of system initiation commands, FIG. 6 is a flow of data acquisition and FIG. 7 is a flow of data packet routing. The method is preferably conducted in part using using a set of instructions stored on a readable medium such as magnetic disc or memory device in a unit such as the DAU described above and shown in FIGS. 1–4.

According to one embodiment of a method according to the present invention, seismic data acquisition is initiated as shown in FIG. 5. A user initiates a request to record seismic data. Typically the user is a field operator at the central truck recorder. The user selects which DAU field units are to be active for the record associated with the seismic data to be acquired. These selections are preferably performed by entering the selections into a computer console at the truck. Once the selections are entered, a command is sent via typical telemetry to the active DAU's 106. A field equipment interface unit housed in the CRS 102 provides interface between the CRS and field equipment.

A table is created describing the active traces, and the table is transmitted to the field equipment interface. The field equipment interface expands the table into a table of expected packets. The field equipment interface then prepares to receive packets from DAUs.

The user selects a time to start recording using the truck console, and a command is issued to the DAUs to assign a time and record identification to packets as characterizing bits.

Referring now to FIG. 6, a data acquisition method according to the present invention begins with sensors providing output signals indicative of a seismic event to activated field units. The DAU field units convert the analog signals to digital signals and the digital signal is placed into a memory device within the field unit.

The stored data is then transferred to a buffer memory as an output data packet. The data packet is then completed by adding characterizing bits, i.e. an identification header is attached which includes a record identification, a trace identification and a sequence number. The data packet with characterizing bit is then transmitted via the telemetry network.

Figure 7A:
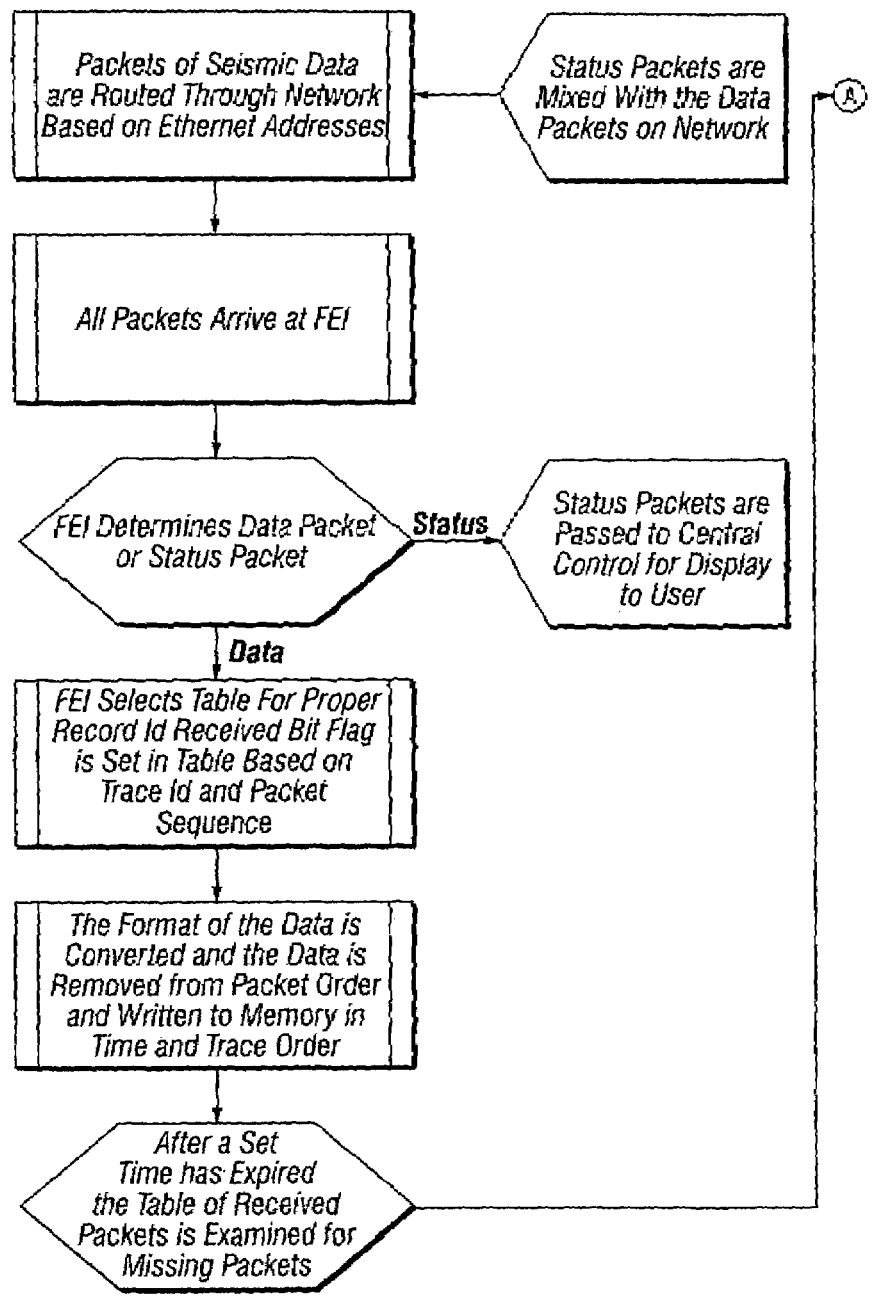
FIGS. 7A–7B are a flow chart showing a method of data routing and transmission according to the present invention.
Figure 7B:
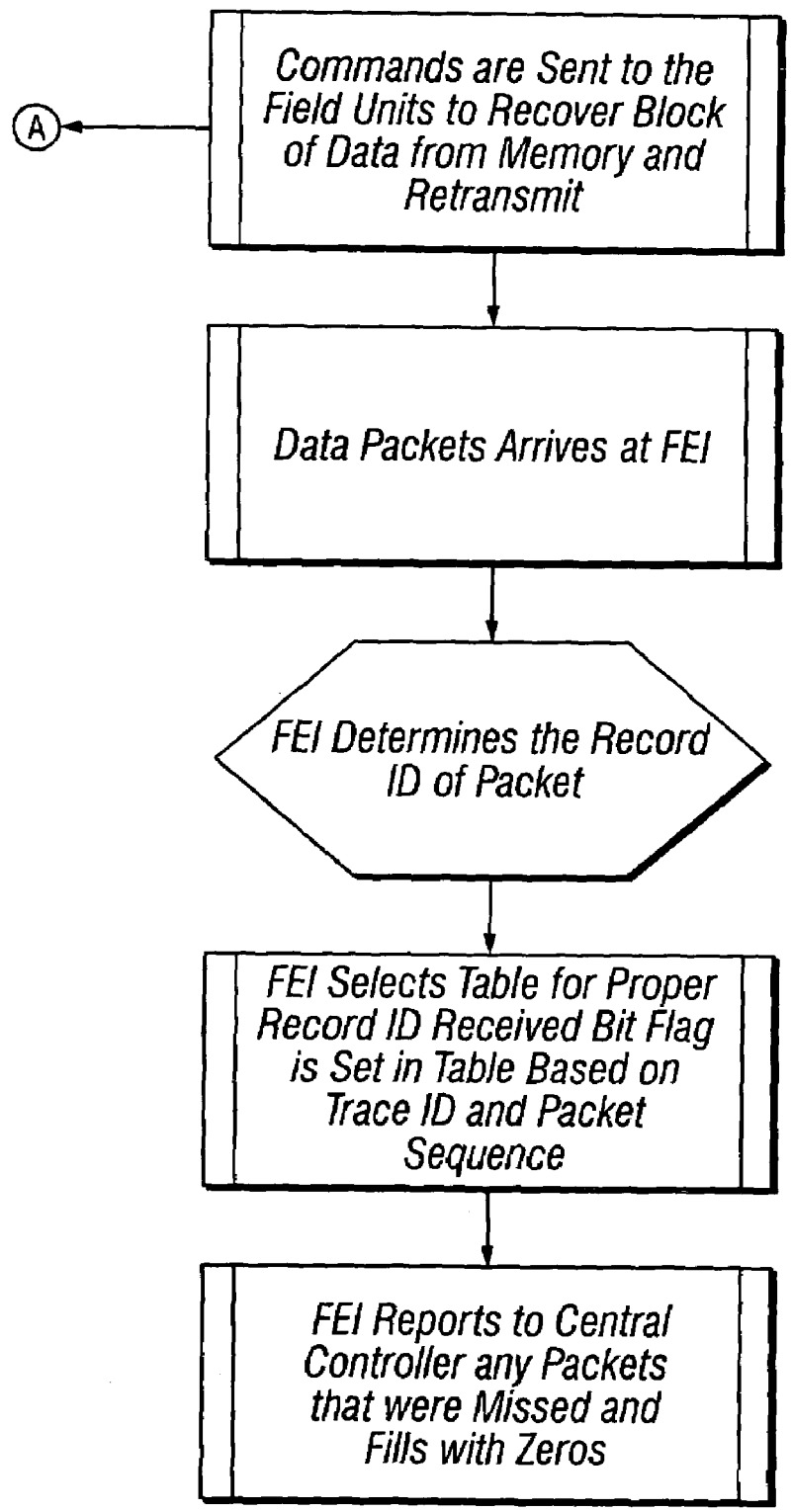

FIGS. 7A–7B are a flow chart to show a data packet routing method according to the present invention. Status packets and data packets are combined on a networked seismic data acquisition system and the packets are the network using Ethernet addresses. All packets are routed to the field equipment interface, and the field equipment interface is used to determine whether the arriving packet is a status packet or a data packet. Status packets are transmitted to an output display in the CRS for display to the user.

When the field equipment interface determines that an arriving packet is a seismic data packet, then an associated table for proper identification is selected and a "received" bit flag is set in the table based on the trace identification and packet sequence information contained in the packet characterizing bits. The format of the seismic data in the packet is converted and removed from the packet in order and written to memory in time and trace order.

After a predetermined time elapses, the table of received packets is examined for missing packets. If the table shows one or more missing packets, then commands are sent to DAUs to recover missing data from the DAU memory and retransmit the data package.

The retransmitted data package is treated in the same manner as the original data packages. The field equipment interface determines that an arriving packet is a seismic data packet, then an associated table for proper identification is selected and a "received" bit flag is set in the table based on the trace identification and packet sequence information contained in the packet characterizing bits. Unrecoverable data package information is assigned a predetermined value to complete the records at the central recorder.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A seismic data acquisition apparatus comprising:
  a) a plurality of sensors for detecting a seismic event, each sensor having an output indicative of the seismic event; and
  b) at least one field unit coupled to the plurality of sensors for receiving each sensor output, the unit transmitting one or more data packets, each of the one or more transmitted data packets comprising a plurality of time samples of each sensor output, wherein each data packet includes one or more characterizing bits representing the time of only the first time sample within the transmitted data packet,
  c) a memory device in the field unit having a predetermined number of memory locations, the field unit storing each data packet in an assigned memory location within the predetermined memory locations, the field unit transmitting the stored data packets to a telemetry network.

2. The apparatus of claim 1, wherein the one or more characterizing bits further include information relating to at least one of sensor location, timing, sensor identification, trace number and record identification.

3. The apparatus of claim 1, wherein each of the plurality of sensors is selected from a group consisting of i) accelerometers; ii) geophones; and iii) hydrophones.

4. The apparatus of claim 1, wherein each of the sensors includes a MEMS accelerometer.

5. The apparatus of claim 4, wherein each of the sensors further comprises a three-component MEMS accelerometer package.

6. The apparatus of claim 1 further comprising at least one second unit coupled to the first unit for receiving the data packets over a primary route, wherein said at least one second unit includes a switching device for determining a direction from which the data packets are transmitted.

7. The apparatus of claim 6, wherein the switching device is adapted to select a secondary route for receiving said data packets when said primary route is not available.

8. The apparatus of claim 6, wherein the at least one second unit includes at least one first port for coupling a low speed route to the second unit and at least one second input port for coupling a high speed route to the second unit.

9. The apparatus of claim 6, wherein the primary route includes at least one of i) an optic fiber and ii) a wire conductor.

10. The apparatus of claim 7, wherein the primary route is an optic fiber and the secondary route is a wire conductor.

11. The apparatus of claim 7, wherein the primary route is a wire conductor and the secondary route is an optic fiber.

12. The apparatus of claim 1 further comprising a central controller for receiving the data packets, said central controller adapted to determine from said characterizing bits a timing parameter for storing said received data packets in order.

13. A method of seismic data acquisition, comprising:
  a) sensing acoustic energy with a plurality of sensors, each sensor providing an output indicative of the sensed energy;
  b) collecting a plurality of time samples of each sensor output;
  c) forming one or more data packets with the collected plurality of time samples:
  d) adding one or more characterizing bits to the data packets, the characterizing bits representing the time of only the first time sample within the data packet;
  e) storing the data packets in predetermined memory locations in a field unit; and
  f) transmitting the data packets.

14. The method of claim 13, wherein the one or more characterizing bits further include information relating to at least one of sensor location, timing, sensor identification, trace number and record identification.

15. The method of claim 13 further comprising wavelength division multiplexing the data packet.

16. The method of claim 13, wherein the data packet includes a synchronizing signal and an Ethernet protocol.

17. The method of claim 13, wherein each of the plurality of sensors is selected from a group consisting of i) accelerometers; ii) geophones; and iii) hydrophones.

18. The method of claim 13, wherein each of the sensors includes a MEMS accelerometer.

19. The method of claim 18, wherein each of the sensors further comprises a three-component MEMS accelerometer package.

20. The method of claim 13, wherein said forming data packet comprises forming a plurality of data packets by combining a plurality of time samples of the sensor outputs into each of the plurality of data packets, the method further comprising:
  a) receiving the plurality of the data packets at a unit having a plurality of input ports, said data packets being transmitted over a primary route;
  b) determining a direction from which each of the plurality of data packets is transmitted using a switching device.

21. The method of claim 20 further comprising selecting a secondary route for receiving said data packets when said primary route is not available.

22. The method of claim 20, wherein the unit includes at least one first port for coupling a low speed route to the unit and at least one second input port for coupling a high speed route to the unit.

23. The method of claim 20, wherein the primary route includes at least one of i) an optic fiber and ii) a wire conductor.

24. The method of claim 21, wherein the primary route is an optic fiber and the secondary route is a wire conductor.

25. The method of claim 21, wherein the primary route is a wire conductor and the secondary route is an optic fiber.

26. The method of claim 13 further comprising:
  a) receiving the data packet at a central controller; and
  b) determining from said characterizing bits a timing parameter for storing said received data packets in order at the central controller.

27. A seismic data acquisition system comprising:
  a) a plurality of sensors for detecting a seismic event, each sensor having an output indicative of the seismic event; and
  b) at least one field unit coupled to the first plurality of sensors for receiving each sensor output, the unit transmitting one or more data packets, each of the one or more transmitted data packets comprising a plurality of time samples of each sensor output, wherein each data packet includes one or more characterizing bits representing the time of only the first time sample within the transmitted data packet;

c) a memory device in the field unit having a predetermined number of memory locations, the field unit storing each data packet in an assigned memory location within the predetermined memory locations, the field unit transmitting the stored data packets to a telemetry network; and d) a main control and recording unit coupled to the telemetry network for receiving the data packets.

28. The system of claim 27, wherein the one or more characterizing bits further include information relating to at least one of sensor location, timing, sensor identification, trace number and record identification.

29. The system of claim 27, wherein each of the plurality of sensors is selected from a group consisting of i) accelerometers; ii) geophones; and iii) hydrophones.

30. The system of claim 27, wherein each of the sensors includes a MEMS accelerometer.

31. The system of claim 30, wherein each of the sensors further comprises a three-component MEMS accelerometer package.

32. The system of claim 27 further comprising at least one second unit coupled to the first unit for receiving the data packets over a primary route, wherein said at least one second unit includes a switching device for determining a direction from which the data packets are transmitted.

33. The system of claim 32, wherein the switching device is adapted to select a secondary route for receiving said data packets when said primary route is not available.

34. The system of claim 32, wherein the at least one second unit includes at least one first port for coupling a low speed route to the second unit and at least one second input port for coupling a high speed route to the second unit.

35. The system of claim 32, wherein the primary route includes at least one of i) an optic fiber and ii) a wire conductor.

36. The system of claim 33, wherein the primary route is an optic fiber and the secondary route is a wire conductor.

37. The system of claim 33, wherein the primary route is a wire conductor and the secondary route is an optic fiber.

38. The system of claim 27 further comprising a central controller for receiving the data packets, said central controller adapted to determine from said characterizing bits a timing parameter for storing said received data packets in order.

39. The system of claim 27 further comprising a conductor coupling the field unit to the main control and recording unit for transmitting a synchronizing signal between the field unit and the central control and recording unit.

* * * * *